(12) United States Patent
Widmann

(10) Patent No.: US 8,457,844 B2
(45) Date of Patent: Jun. 4, 2013

(54) PARALLEL PARKING ASSISTANT SYSTEM AND METHOD THEREOF

(75) Inventor: Glenn R. Widmann, Noblesville, IN (US)

(73) Assignee: Delphi Technologies, Inc., Troy, MI (US)

( * ) Notice: Subject to any disclaimer, the term of this patent is extended or adjusted under 35 U.S.C. 154(b) by 589 days.

(21) Appl. No.: 12/758,218

(22) Filed: Apr. 12, 2010

(65) Prior Publication Data

US 2011/0251755 A1  Oct. 13, 2011

(51) Int. Cl.
*G06F 19/00* (2006.01)

(52) U.S. Cl.
USPC ............... 701/42; 701/41; 701/44; 180/204

(58) Field of Classification Search
USPC ............ 701/36, 23, 41, 42, 96, 44; 180/204
See application file for complete search history.

(56) References Cited

U.S. PATENT DOCUMENTS

| | | | |
|---|---|---|---|
| 7,469,765 B2* | 12/2008 | Spannheimer et al. | 180/204 |
| 8,099,214 B2* | 1/2012 | Moshchuk et al. | 701/41 |
| 2002/0041239 A1 | 4/2002 | Shimizu et al. | |
| 2008/0100472 A1 | 5/2008 | Mizusawa et al. | |
| 2009/0121899 A1 | 5/2009 | Kakinami et al. | |
| 2009/0157260 A1 | 6/2009 | Lee | |

FOREIGN PATENT DOCUMENTS

| | | |
|---|---|---|
| EP | 1 839 948 | 10/2007 |
| EP | 1 908 641 | 4/2008 |
| EP | 2 098 439 | 9/2009 |
| JP | 2004-9791 | 1/2004 |
| WO | 2008/055567 | 5/2008 |

OTHER PUBLICATIONS

European Search Report dated Jun. 7, 2011.

* cited by examiner

*Primary Examiner* — Richard M. Camby
(74) *Attorney, Agent, or Firm* — Lawrence D. Hazelton

(57) ABSTRACT

A parallel parking assistant system integrated with a vehicle and method thereof are provided, the parking assistant system including a first sensor configured to determine a first distance, a second sensor configured to determine a second distance, and a controller configured to provide commands as a function of the first and second determined distances. The commands include a first command configured to command a steering system to be in a clockwise position while the vehicle is moving in a reverse direction for a first reversing distance, a second command configured to command the steering system to be in a substantially straight position while the vehicle is moving in a reverse direction for a second reversing distance, and a third command configured to command the steering system to be in a counter-clockwise position while the vehicle is a moving in a reverse direction for a third reversing distance.

12 Claims, 7 Drawing Sheets

PARALLEL PARKING ASSISTANT SYSTEM AND METHOD THEREOF

FIELD OF THE INVENTION

The present invention generally relates to a parking assistant system and method thereof, and more particularly, a parallel parking assistant system integrated with a vehicle and a method thereof.

BACKGROUND OF THE INVENTION

Generally, autonomous parallel parking systems require the use of multiple distance sensors that are strategically located at various locations around a host vehicle body structure, such as a front-side fascia, a rear-side fascia, a front bumper, and a rear bumper. These sensors can collectively measure various displacements between the host vehicle and adjacent parked vehicles. The controller can use these various displacement measurements to implement algorithms to adjust a steer angle of the host vehicle to allow the host vehicle to back into the parking space and avoid impacting the adjacent parked vehicles.

These parallel-parking systems can be expensive due to the cost of the multiple sensors and the controller that processes the algorithms. Typically, the parallel-parking system implementation can require the additional cost of controllable steering (e.g., electric power steering), controllable brakes, and controllable throttles.

SUMMARY OF THE INVENTION

According to one aspect of the present invention, a parallel parking assistant system integrated with a vehicle that includes a steering system, a brake system, and a throttle system is provided. The parking assistant system includes a first sensor configured to determine a first distance to an object adjacent to a side of the vehicle, a second sensor configured to determine a second distance between a forward positioned object and a rear positioned object that define a parking space, and a controller in communication with the first and second sensors, wherein the controller is configured to provide commands to control the steering system, the brake system, and the throttle system of the vehicle as a function of the first and second determined distances. The commands include a first command configured to command the steering system to be in a clockwise position while the vehicle is moving in a reverse direction for a first reversing distance, a second command configured to command the steering system to be in a substantially straight position while the vehicle is moving in a reverse direction for a second reversing distance, wherein a distance traveled during the first and second reversing distances is a function of a length of the vehicle, and a third command configured to command the steering system to be in a counter-clockwise position while the vehicle is a moving in a reverse direction for a third reversing distance, wherein a distance traveled during the first, second, and third reversing distances is a function of the determined first and second distances, a longitudinal displacement of the vehicle during the first, second, and third commands, and a lateral displacement of the vehicle during the first, second, and third commands.

According to another aspect of the present invention, a method of parallel parking a vehicle including a steering system is provided. The method includes the steps of determining a first distance between a side of the vehicle and an object adjacent the side of the vehicle, determining a second distance between a forward positioned object and rear positioned object that define a parking space, rotating the steering system in a clockwise direction while the vehicle is moving in a reverse direction for a first reversing direction, rotating the steering system to a substantially straight position while the vehicle is moving in a reverse direction for a second reversing direction, wherein a distance traveled during the first and second reversing distances is a function of a length of the vehicle, and rotating the steering system to a counter-clockwise direction while the vehicle is moving in a reverse direction for a third reversing direction, wherein a distance traveled during the first, second, and third distances is a function of the determined distance, a longitudinal displacement of the vehicle during the rotating the steering system step, and a lateral displacement of the vehicle during the rotating the steering system step.

According to yet another aspect of the present invention, a method of parallel parking a host vehicle is provided that includes the steps of determining a lateral and longitudinal distance of a parking space, determining an offset distance between the host vehicle and an adjacent forward positioned object, implementing a first substantially maximum turning operation while displacing the vehicle a first reversing distance, implementing a substantially straight operation while displacing the vehicle a second reversing distance, and implementing a second substantially maximum turning operation while displacing the vehicle a third reversing distance, wherein the first substantially maximum turning operation and the second substantially maximum turning operation are different directions.

These and other features, advantages, and objects of the present invention will be further understood and appreciated by those skilled in the art by reference to the following specification, claims, and appended drawings

BRIEF DESCRIPTION OF THE DRAWINGS

The present invention will now be described, by way of example, with reference to the accompanying drawings, in which.

DESCRIPTION OF EMBODIMENTS

Figure 1:
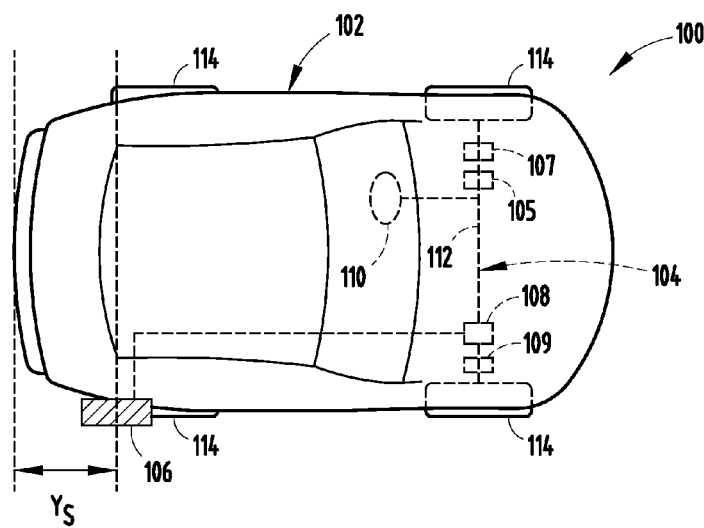
FIG. 1 is a schematic diagram of a parallel parking assistant system integrated with a vehicle, in accordance with one embodiment of the present invention.

In regards to FIG. 1, a parallel parking assistant system is generally shown at reference identifier 100. Typically, the parallel parking assistant system 100 is integrated with a vehicle, which is generally indicated at reference identifier 102 and/or $V_H$, and can include a steering system that is generally indicated at reference identifier 104, a brake system 105, and a throttle system 107. The parallel parking assistant system 100 can further include a first sensor 106 that is configured to determine a first distance to an object adjacent to a side of the vehicle 102, $V_H$ (FIGS. 3-5 and 7), and a second sensor 109 configured to determine a second distance between a forward positioned object and a rear positioned object that define a parking space. The parallel parking assistant system 100 can also include a controller 108 in communication with the first sensor 106 and the second sensor 109, wherein the controller 108 is configured to provide commands to the steering system 104, the brake system 105, and the throttle system 107 of the vehicle 102, $V_H$ for steering the vehicle 102, $V_H$ as a function of the determined first and second distances.

The commands provided by the controller 108 can include a first command configured to command the steering system 104 to be in a clockwise position while the vehicle 102, $V_H$ is moving in a reverse direction for a first reversing distance. The commands provided by the controller 108 can further include a second command configured to command the steering system 104 to be in a substantially straight position while the vehicle 102, $V_H$ is moving in a reverse direction for a second reversing distance, wherein a distance traveled during the first and second reversing distances is a function of a length of the vehicle ($V_L$) 102. Also, a third command can be configured to command the steering system 104 to be in a counter-clockwise position while the vehicle 102, $V_H$ is moving in a reverse direction for a third reversing distance, wherein a distance traveled during the first, second, and third reversing distances is a function of the determined distances, a longitudinal displacement of the vehicle 102, $V_H$ during the first, second, and third commands, and a lateral displacement of the vehicle 102, $V_H$ during the first, second, and third commands, as set forth in greater detail herein.

According to one embodiment, the parallel parking assistant system 100 can use the sensor 106 that is a short-range distance sensor. The sensor 106 can be positioned on a passenger side of the vehicle 102, $V_H$, such that the parallel parking assistant system 100 is configured to parallel park the vehicle 102, $V_H$ with respect to the passenger side of the vehicle 102, $V_H$ as a function of one or more outputs of the sensor 106. Typically, the sensor 106 can be located on the passenger side of the vehicle 102, $V_H$ in order to measure the offset distance $X_{OFFSET}$ (FIG. 3) between the vehicle 102, $V_H$ and an adjacent object (e.g., an adjacently parked vehicle $V_F$). According to one embodiment, the offset distance $X_{OFFSET}$ can be a minimum distance between the vehicle 102, $V_H$ and the forward positioned object $V_F$, a maximum distance between the vehicle 102, $V_H$ and the rear positioned object $V_F$, or an average distance between the vehicle 102, $V_H$ and the forward positioned object $V_F$ and the vehicle 102, $V_H$ and the rear positioned object $V_R$. However, it should be appreciated by those skilled in the art that other suitable determined, measured, or calculated distances can be used to determine the offset distance $X_{OFFSET}$. The parallel parking assistant system 100 can then accomplish the parallel parking of the vehicle 102, $V_H$ by having three (3) turning sequences while the vehicle 102, $V_H$ is moving in a reverse direction, which can allow for both an autonomous, semi-autonomous, or manual mode, as described in greater detail herein.

For purposes of explanation and not limitation, the parallel parking assistant system 100 is illustrated and described herein with the sensor 106 being located on a passenger side of the vehicle 102, $V_H$, such that the vehicle 102, $V_H$ is parallel parked with respect to the passenger side. However, it should be appreciated by those skilled in the art that an additional sensor or the sensor 106 can be located on a driver's side of the vehicle 102, $V_H$, such that the parallel parking assistant system 100 can parallel park the vehicle 102, $V_H$ with respect to a driver's side of the vehicle 102, $V_H$. By way of explanation and not limitation, the sensor 106, 109 can be at least one of an ultrasonic sensor, a radar sensor, a lidar sensor, a camera, the like, or a combination thereof.

The controller 108 can be configured to be both, but only one at a time, in an autonomous mode, in a semi-autonomous mode, or in a manual mode according to one embodiment. Typically, the controller 108 can provide the commands to the steering system 104 when the controller 108 is in the autonomous mode. When the controller 108 is in the manual mode, the controller 108 can provide the commands to a user of the vehicle 102, $V_H$, such that the user can control a steering system 104 of the vehicle 102, $V_H$ based upon the provided commands. In such a manual mode, the controller 108 can provide the commands by an audio enunciation, a visual output (e.g., one or more indicator lights, an output on a screen, such as, but not limited to, a navigation system screen), the like, or a combination thereof. The semi-autonomous mode can incorporate a portion of functions of the autonomous mode and a portion of functions of the manual mode. A configuration to switch between the autonomous mode, the semi-autonomous mode, and the manual mode can be configured by a manufacturer of the vehicle 102, $V_H$, a manufacturer of the parallel parking assistant system 100 and/or other components of the vehicle 102, $V_H$, a dealer or seller of the vehicle 102, $V_H$, a user of the vehicle 102, $V_H$, or a combination thereof.

The steering system 104 can include a steering wheel 110 operably connected to a front axle 112, and the front axle 112 can be operably connected to one or more wheels 114, according to one embodiment. Typically, when the steering system 104 is turned to a clockwise direction, the steering wheel 110 is activated or turned in a clockwise direction so that the one or more wheels 114 operably connected to the steering wheel 110 would direct the vehicle 102, $V_H$ in a clockwise direction when the vehicle 102, $V_H$ is traveling in a forward direction with respect to a normal operational position of the vehicle 102, $V_H$. Similarly, when the steering system 104 is turned to a substantially straight or turned to a counter-clockwise direction, the steering wheel 110 is activated or turned in a substantially straight or counter-clockwise direction, so that the one or more wheels 114 operably connected to the steering wheel 110 would direct the vehicle 102, $V_H$ in a substantially straight or counter-clockwise direction when the vehicle 102, $V_H$ is traveling in a forward direction with respect to a normal operational position of the vehicle 102, $V_H$, respectively.

According to one embodiment, the sensor 106 can be positioned on a rear portion of the passenger side of the vehicle 102, $V_H$ (FIG. 1), such that the controller 108 can be configured to provide the first, second, and third commands as a function of a lateral displacement between the rear portion of the passenger side of the vehicle 102, $V_H$ and one or more objects adjacent thereto (e.g., a forward and rear parked vehicle $V_F$, $V_R$). The controller 108 can also be configured to provide a command prior to the first command, wherein the prior command can be configured to command the steering system 104 to be in a substantially straight position, while the vehicle 102, $V_H$ is moving in a forward direction from a rear positioned adjacent object towards a forward positioned adjacent object, such that the forward positioned adjacent object and rear positioned object define a parking space.

In such an embodiment, the second sensor 109 can be, but is not limited to, a wheel speed sensor configured to determine the distance between the forward positioned object (e.g., a forward parked vehicle $V_F$) and the rear positioned object (e.g., a rear parked vehicle $V_R$). Thus, the first sensor 106 can be used to measure an offset distance ($X_{OFFSET}$) to determine if a parking space exists, and the second sensor 109 can be used to measure a length of a parking space. However, it should be appreciated by those skilled in the art that the forward positioned object, the rear positioned object, or a combination thereof, can be objects other than vehicles, and that a description herein as to other parked vehicles is for purposes of explanation and not limitation. Additionally or alternatively, the second sensor 109 can be used to measure the first reversing distance, the second reversing distance, the third reversing distance, the like, or a combination thereof.

Figures 2A, 2B:
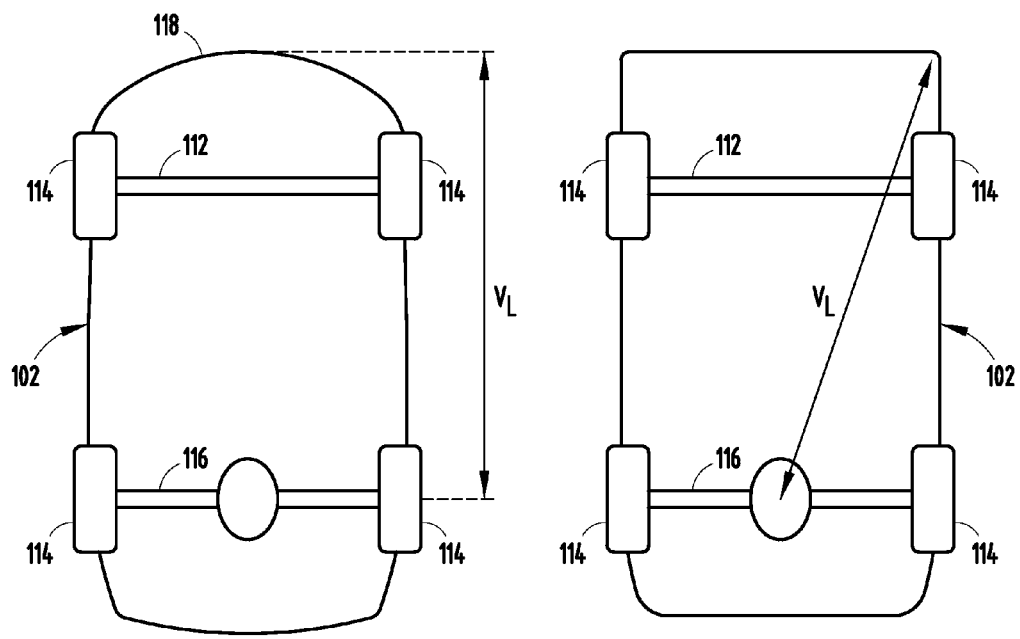
FIG. 2A is a schematic diagram of a vehicle illustrating an exemplary vehicle length $V_L$ of a round-front vehicle, in accordance with one embodiment of the present invention.
FIG. 2B is a schematic diagram of a vehicle illustrating an exemplary vehicle length $V_L$ of a flat-front vehicle, in accordance with one embodiment of the present invention.

In regards to FIGS. 1-2B, these figures illustrate exemplary dimensions that can be measured or can be known values within the parallel parking assistant system 100. According to one embodiment, the sensor 106 is located on the passenger side of the vehicle 102, $V_H$, wherein a distance $Y_S$ is the distance between a most rear portion of the vehicle 102, $V_H$ and the sensor 106 (FIG. 1). With respect to FIG. 2A, the vehicle 102 (or host vehicle $V_H$) length $V_L$ can be determined by the distance between an approximate center point of a rear axle 116 to approximately a front bumper 118. Alternatively, in a flat-front vehicle 102, $V_H$ type (FIG. 2B), the vehicle 102, $V_H$ length $V_L$ can be from an approximate center point of the rear axle 116 to approximately a front corner of the vehicle 102, $V_H$.

Figure 3:
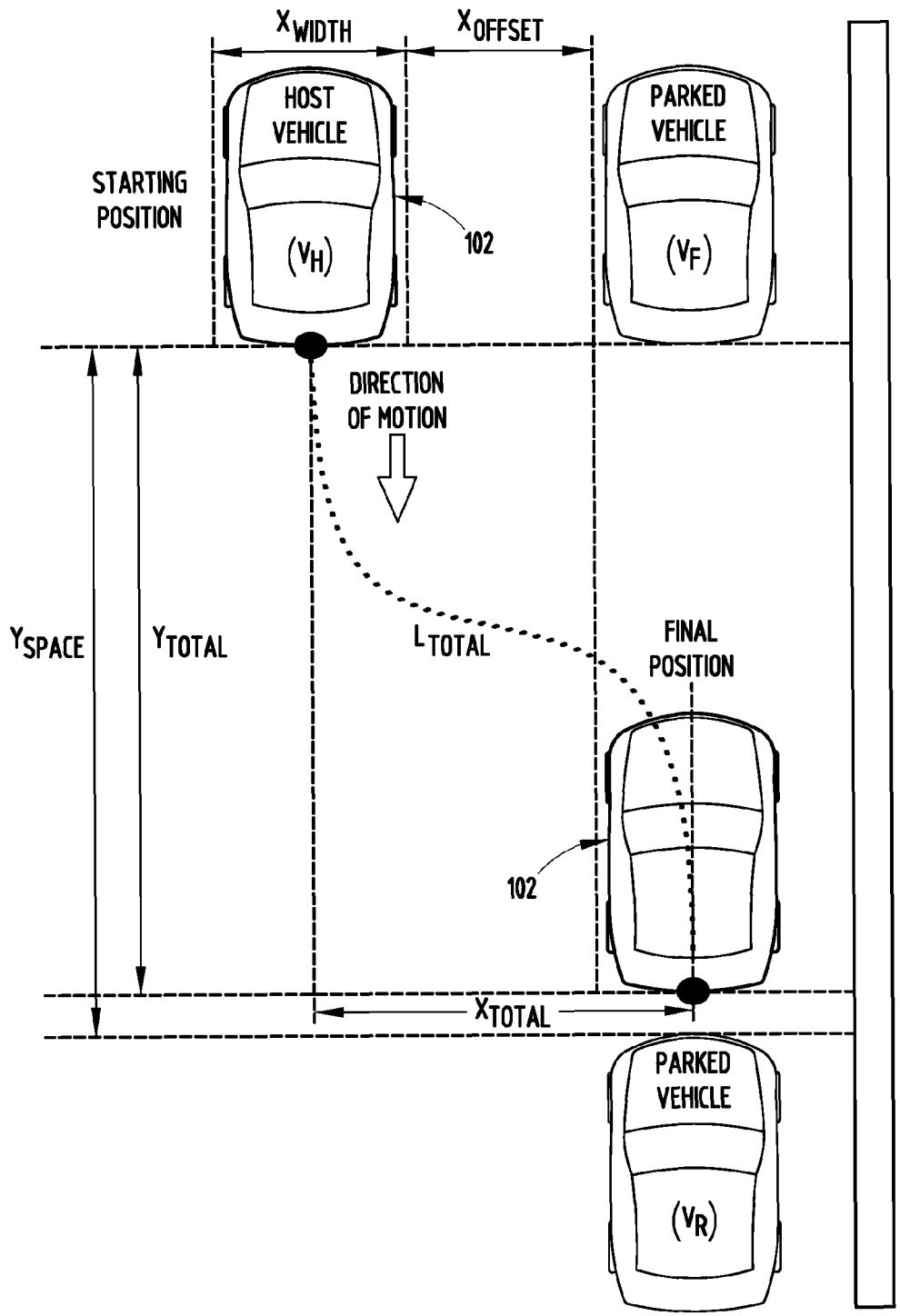
FIG. 3 is a schematic diagram illustrating an exemplary path of travel of a vehicle when parallel parking, in accordance with one embodiment of the present invention.

In regards to FIG. 3, a width of the vehicle 102, $V_H$ is represented by $X_{WIDTH}$, and a displacement between the vehicle 102, $V_H$ and a front parked vehicle $V_F$ is represented by $X_{OFFSET}$. Typically, the displacement value $X_{OFFSET}$ is measured by the sensor 106. A longitudinal value $Y_{SPACE}$ of an available parking space, which is typically defined by the space between the front parked vehicle $V_F$ and a rear parked vehicle $V_R$ can be determined. The longitudinal value $Y_{SPACE}$ can be measured by a second sensor 109, such as, but not limited to, a wheel speed sensor. A total lateral displacement resulting from a completed parallel park maneuver can be represented by $X_{TOTAL}$, while the total longitudinal displacement resulting from a completed parallel park maneuver can be represented by $Y_{TOTAL}$. Also, a total distance traveled by the host vehicle 102, $V_H$ to complete a parallel park maneuver can be represented by $L_{TOTAL}$.

Typically, to conduct a parallel parking procedure, the displacement $X_{OFFSET}$ between the host vehicle 102, $V_H$ and a front park vehicle $V_F$ can be limited within the bounds of:

$$0 < X_{MIN} < X_{OFFSET} < X_{MAX} \quad \text{Eq. 1:}$$

Typically, variables $X_{MAX}$ and $X_{MIN}$ are selected based upon allowing satisfaction of geometric approximation of turning procedures. The variable $X_{MIN}$ can be limited by the distance to an adjacent object (e.g., the front parked vehicle $V_F$), since the vehicle 102, $V_H$ cannot be located in the exact same position as any part of the adjacent objects (e.g., parked vehicle's $V_F$, $V_R$), and thus, the variable $X_{MIN}$ has a value of greater than zero. According to one embodiment, the variable $X_{OFFSET}$ has a value that is equal to or greater than approximately six inches (6 in), and the variable of $X_{MAX}$ can have a value suitable to ensure the vehicle 102, $V_H$ is approximately one driving lane over from the adjacent objects (e.g., parked vehicles $V_F$, $V_R$). However, it should be appreciated by those skilled in the art that the variable $X_{MAX}$ can have any value, but may be limited by other factors, such as, but not limited to, typical dimensions of roadways, a turning radius of the vehicle 102, $V_H$, an error or tolerance of a travel path shape or distance, the like, or a combination hereof. Additionally or alternatively, the value of the displacement $X_{OFFSET}$ can vary, such that the value of the displacement $X_{OFFSET}$ can be, but is not limited to, a combination of values or an average of values.

A total lateral displacement $X_{TOTAL}$ can result in an edge alignment of the vehicle 102, $V_H$ and a front parked vehicle $V_F$, which can be represented by:

$$X_{TOTAL} = X_{OFFSET} + X_{WIDTH} \quad \text{Eq. 2:}$$

The total longitudinal displacement $Y_{TOTAL}$ for a parallel parking operation can be determined to be able to fit into an allowable parking space as represented by the following equation:

$$Y_{TOTAL} < Y_{SPACE} \quad \text{Eq. 3:}$$

Figure 4:
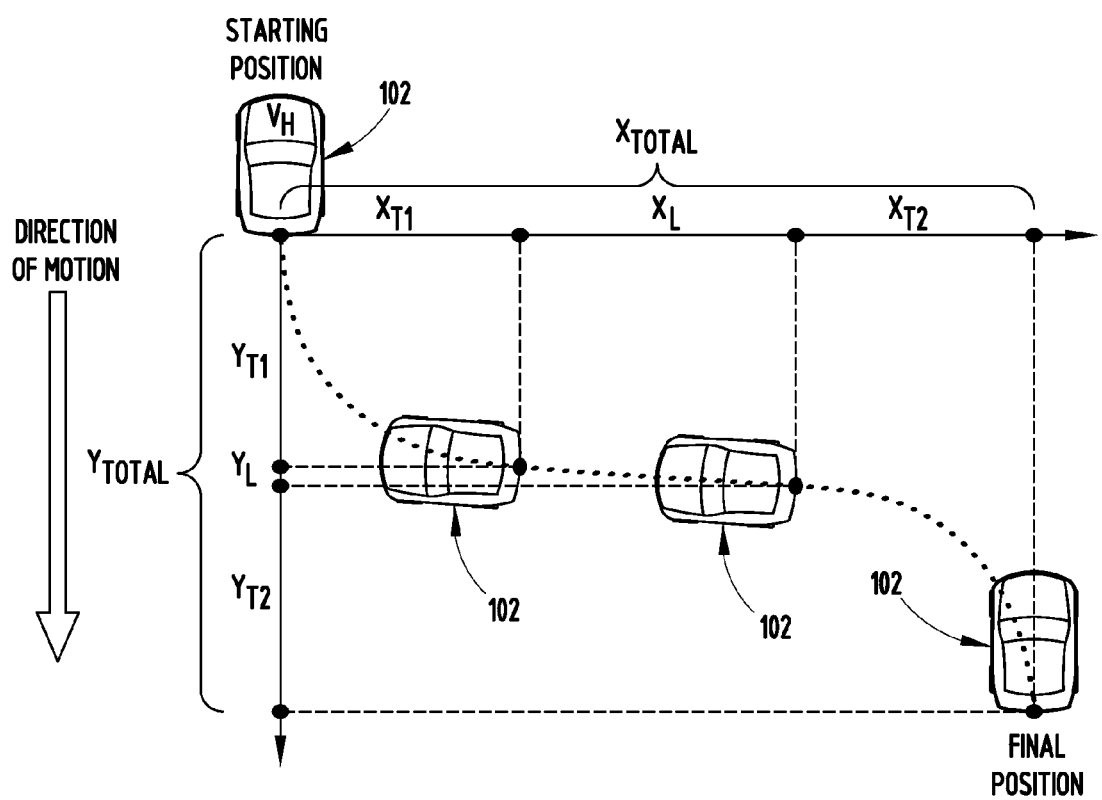
FIG. 4 is a schematic diagram illustrating an exemplary path of travel of a vehicle when parallel parking, in accordance with one embodiment of the present invention.

With respect to FIG. 4, in an embodiment that is utilizing a three (3) steering system 104 turning operation (e.g., two (2) opposing turning backward maneuvers connected by a substantially straight or linear backing maneuver), various displacement values can be determined. Typically, the first turning backing maneuver is where the steering system 104 is substantially locked in a clockwise direction, and the linear backing maneuver can be with the steering system 104 is substantially straight (e.g., $\theta_{STEERING} = 0°$). Further, the second turning backing operation can be where the steering system 104 is substantially locked in a counter-clockwise direction. According to one embodiment, the steering system 104 is locked when the steering wheel 110 is turned a maximum position in either direction.

The first turning backing maneuver in combination with the substantially straight backing maneuver can be configured so that a front end of the vehicle 102, $V_H$ does not contact the front parked vehicle $V_F$ when the vehicle 102, $V_H$ is conducting the second turning backing maneuver, according to one embodiment. Various longitudinal displacement values of the vehicle 102, $V_H$ during the three (3) steering system 104 turning operation that can be determined are a displacement resulting from a first turning backing maneuver $Y_{T1}$, a displacement resulting from the substantially straight backing maneuver $Y_L$, and a displacement resulting from a second turning backing maneuver $YT_{T2}$. A total longitudinal displacement $Y_{TOTAL}$ can be calculated utilizing the following equation:

$$Y_{TOTAL} = Y_{T1} + Y_L Y_{T2} \quad \text{Eq. 4:}$$

Additionally, the vehicle 102, $V_H$ can have a lateral displacement when utilizing the three (3) steering system 104 turning operation. Various lateral displacement values that can be determined include a displacement resulting from first turning backing maneuver $X_{T1}$, a displacement resulting from a substantially straight backing maneuver $X_L$, and a displacement resulting from a second turning backing maneuver $X_{T2}$. A total lateral displacement $X_{TOTAL}$ can be calculated utilizing the following equation:

$$X_{TOTAL} = X_{T1} + X_L + X_{T2} \quad \text{Eq. 5:}$$

Figure 5:
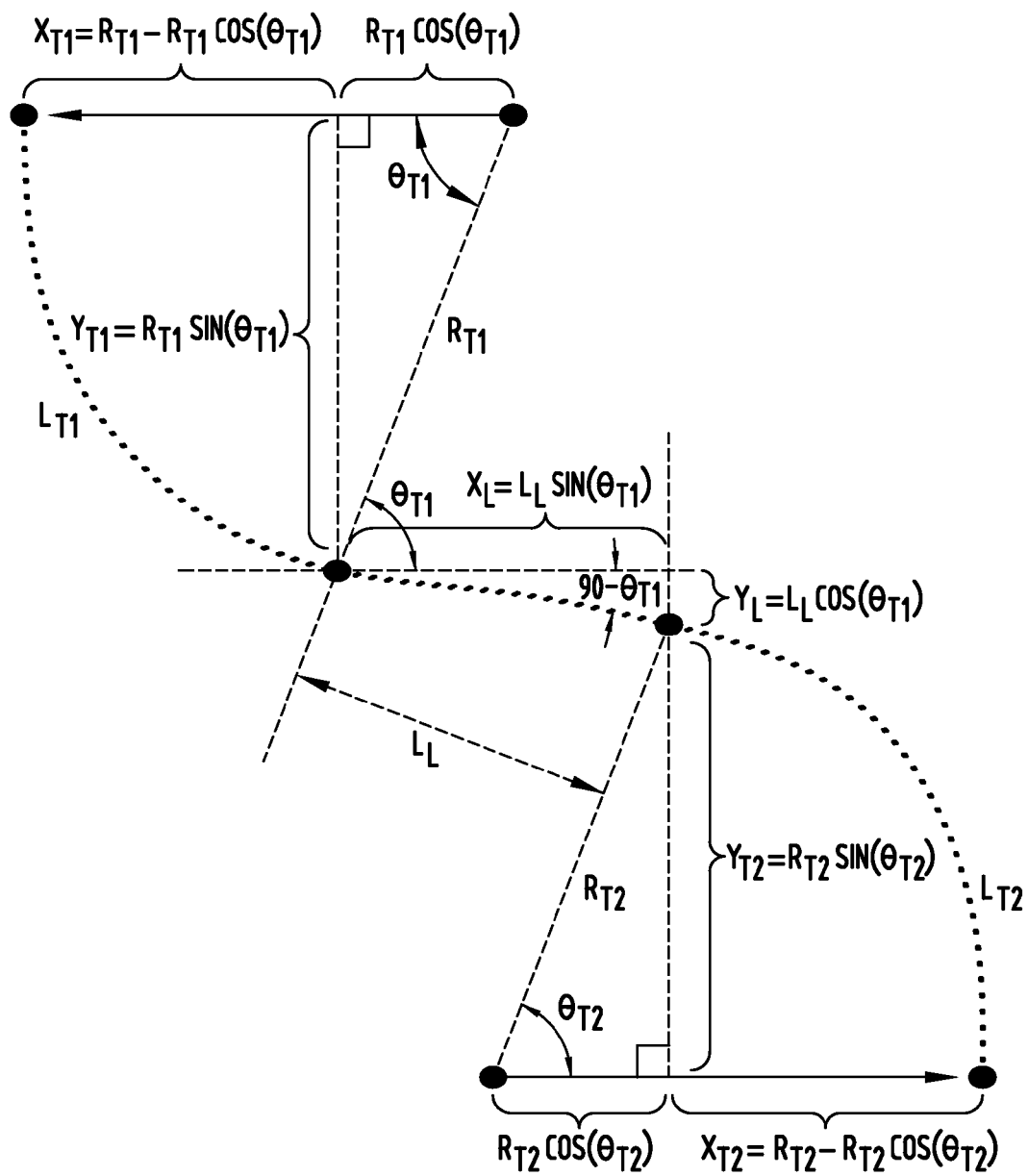
FIG. 5 is a schematic diagram illustrating an exemplary path of travel of a vehicle when parallel parking, in accordance with one embodiment of the present invention.
Figure 6:
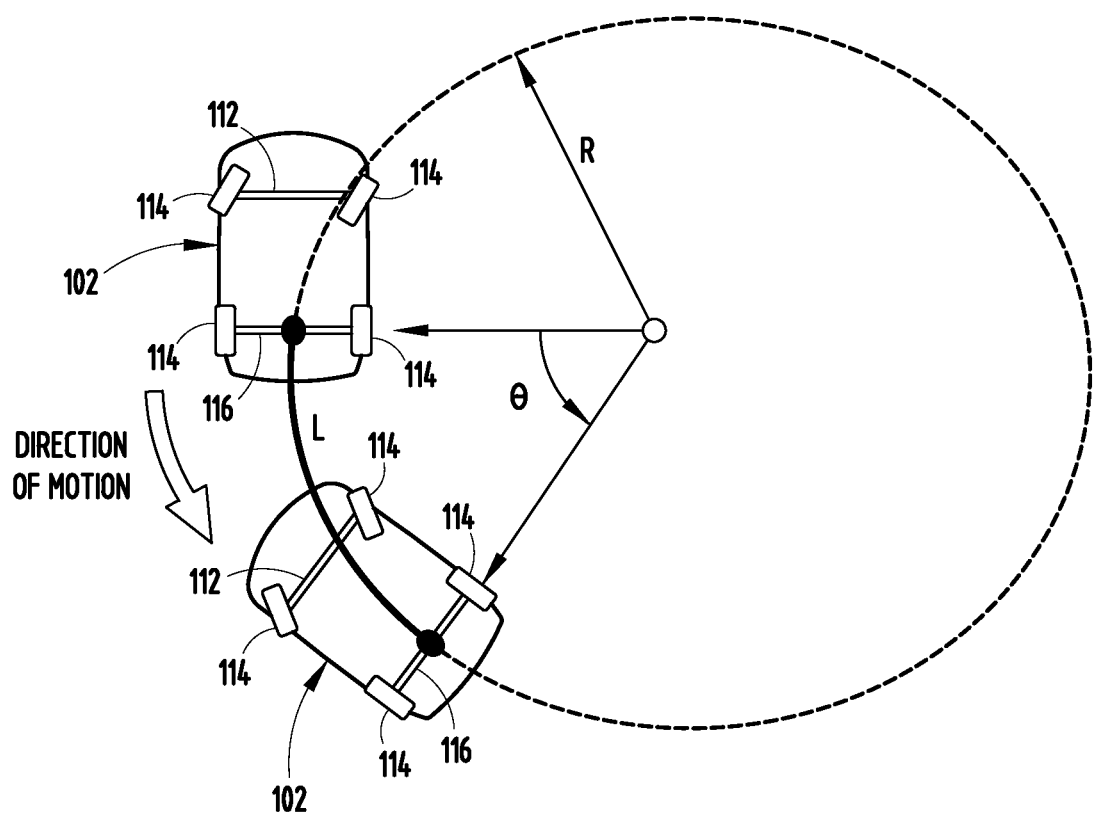
FIG. 6 is a schematic diagram illustrating an exemplary path of travel of a vehicle when a steering system of the vehicle is turned to a substantially locked position in a clockwise direction, in accordance with one embodiment of the present invention.

In regards to FIGS. 5 and 6, exemplary geometry characteristics of a parallel parking maneuver are shown. Typically, a motion of one or more rear wheels 114 is approximated by a circle when substantially locking the steering system 104 while performing a backing maneuver (FIG. 6). However, front wheels 114 of the vehicle 102, $V_H$ typically do not have the same turning radius as rear wheels 114, and the rear axis 116 can point to a center of an imaginary circle, such that a frame of reference is a center point of the rear axle 116 (e.g., a motion traveled). Circle characteristics with respect to the rear axle 116 of the vehicle 102, $V_H$ can include a radius of an exemplary turning circle R, angle displacement by a turn θ, and a length of arc traveled by the angle displacement L. Typically, for a small angle displacement θ, the circle approximation is nearly correct. This condition can be ensured by satisfaction within geometric bounds of the parallel parking procedure. According to one embodiment, testing can be conducted with the vehicle 102, $V_H$ to obtain data and provide table look up values of "R" and "L" variables for various circumstances.

Longitudinal displacement geometric relationships (FIG. 5) can be calculated by the following equations:

$$Y_{T1} = R_{T1} \sin(\theta_{T1}) \qquad \text{Eq. 6:}$$

$$Y_L = L_L \cos(\theta_{T1}) \qquad \text{Eq. 7:}$$

$$Y_{T2} = R_{T2} \sin(\theta_{T2}) \qquad \text{Eq. 8:}$$

Lateral displacement geometric relationships (FIG. 5) can be calculated using the following equations:

$$X_{T1} = R_{T1} - R_{T1} \cos(\theta_{T1}) = R_{T1}[1 - \cos(\theta_{T1})] \qquad \text{Eq. 9:}$$

$$X_L = L_L \sin(\theta_{T1}) \qquad \text{Eq. 10:}$$

$$X_{T2} = R_{T2} - R_{T2} \cos(\theta_{T2}) = R_{T2}[1 - \cos(\theta_{T2})] \qquad \text{Eq. 11:}$$

The vehicle 102, $V_H$ motion displacement along a circular arc can have various characteristics. A distance traveled from a first turning backing maneuver $L_{T1}$ can be calculated using the following equation:

$$L_{T1} = R_{T1}\theta_{T1}, \text{ (wherein } \theta_{T1} \text{ is specified in radians)} \qquad \text{Eq. 12:}$$

A distance traveled from a substantially straight backing maneuver $L_L$ can be determined. Also, a distance traveled from a second turning backing maneuver $L_{T2}$ can be calculated by the following equation:

$$L_{T2} = R_{T2}\theta_{T2} \text{ (wherein } \theta_{T2} \text{ is specified in radians)} \qquad \text{Eq. 13:}$$

Thus, a total distance traveled can be represented by $L_{TOTAL}$, and calculated by the following equation:

$$L_{TOTAL} = L_{T1} + L_L + L_{T2} \qquad \text{Eq. 14:}$$

On-board vehicle motion sensors such as, but not limited to, the second sensor 109 (e.g., wheel speed sensors), can provide actual measurements of motions traveled parameters (e.g., $L_{T1}$, $L_L$, $L_{T2}$) and approximately translated to a rear axle coordinate frame, according to one embodiment. Measured parameters can include a measured distance traveled from a first turning backing maneuver $L_{T1M}$, a measured distance traveled from a substantially linear backing maneuver $L_{LM}$, and a measured distance traveled from a second turning back maneuver $L_{T2M}$.

According to one embodiment, opposing circular backing maneuver characteristics can be substantially identical. In such an embodiment, the host vehicle 102, $V_H$ can have backing dynamic motion parameter characteristics R, S, and θ that are substantially identical when the steering system 104 is substantially locked in either the clockwise or counter-clockwise position. When assuming the turning characteristics are substantially identical, then the various backing dynamic motion parameter characteristics can be calculated by the following equations:

$$\theta_T = \theta_{T1} = \theta_{T2} \qquad \text{Eq. 15:}$$

$$R_T = R_{T1} = R_{T2} \qquad \text{Eq. 16:}$$

$$L_T = L_{T1} = L_{T2} \qquad \text{Eq. 17:}$$

Substitutions of Equations 15 and 16 into Equations 4-11, and simplification thereof yields:

$$Y_{TOTAL} = 2Y_T + Y_L = 2R_T \sin(\theta_T) + L_L \cos(\theta_T) \qquad \text{Eq. 18:}$$

$$X_{TOTAL} = 2X_T + X_L = 2R_T[1 - \cos(\theta_T)] + L_L \sin(\theta_T) \qquad \text{Eq. 19:}$$

According to one embodiment, the longitudinal and lateral displacements of the vehicle 102, $V_H$ doing the first turning backing maneuver $Y_{T1}$, $X_{T1}$, and the substantially straight backing maneuver $Y_L$, $X_L$, are determined to ensure vehicle's 102, $V_H$ front bumper 118 does not contact the front parked vehicles $V_F$ rear bumper when performing the second turning backing maneuver (FIG. 4). In such an embodiment, a length $L_V$ of the vehicle 102, $V_H$ can be substantially equal to the combined longitudinal components of the first backing maneuver $Y_{T1}$ and the substantially straight backing maneuver $Y_L$, as represented by the following equation:

$$L_V = Y_{T1} + Y_L \qquad \text{Eq. 20:}$$

Substitution of Equations 6 and 7 with Equations 15 and 16 into Equation 20 yields:

$$L_V = R_T \sin(\theta_T) + L_L \cos(\theta_T) \qquad \text{Eq. 21:}$$

Solving Equation 21 for $L_L$ is represented by the following equation:

$$L_L = \frac{L_V}{\cos(\theta_T)} - R_T \tan(\theta_T) \qquad \text{Eq. 22}$$

Total linear displacement $X_{TOTAL}$ to accomplish a parallel parking maneuver can be calculated by substituting Equations 2 and 22 into Equation 19, which yields the following equation:

$$X_{OFFSET} + X_{WIDTH} = \qquad \text{Eq. 23}$$
$$2R_T[1 - \cos(\theta_T)] + \left[\frac{L_V}{\cos(\theta_T)} - R_T \tan(\theta_T)\right] \sin(\theta_T)$$

Further simplification of Equation 23 yields:

$$X_{OFFSET} + X_{WIDTH} = R_T[2 - 2\cos(\theta_T) - \sin(\theta_T)\tan(\theta_T)] + L_V \tan(\theta_T) \qquad \text{Eq. 24:}$$

Solving for a subtended angle displaced by a turn $\theta_T$ from Equation 24, wherein the parameters set ($X_{OFFSET}$, $X_{WIDTH}$, $R_T$, $L_V$) are typically known values, yield the following closed-form geometric equation:

$$\theta_T = f(X_{OFFSET}, X_{WIDTH}, R_T, L_V) \qquad \text{Eq. 25:}$$

Typically, $\theta_T$ of Equation 24 is solved using numerical analysis techniques. According to one embodiment, the values of $X_{OFFSET}$, $X_{WIDTH}$, $R_T$, and $L_V$ can be known values because these values are determined using the first sensor 106 and/or the second sensor 109, they are measurable parameters of the vehicle 102, $V_H$, the like, or a combination thereof.

Total longitudinal displacement $Y_{TOTAL}$ required for a parallel parking maneuver can be represented by substituting Equation 22 into Equation 18, which yields the following equation:

$$Y_{TOTAL} = 2R_T \sin[(\theta)]_T) + \left[\frac{L_V}{\cos(\theta_T)} - R_T\tan(\theta_T)\right]_{\cos(\theta_T)} \quad \text{Eq. 26}$$

Further simplification of Equation 26 yields the following equation:

$$Y_{TOTAL} = R_T \sin(\theta_T) + L_V \quad \text{Eq. 27:}$$

Knowing $\theta_T$ by utilizing Equation 25, then Equation 27 can yield the following closed-form geometric equation:

$$Y_{TOTAL} = R_T \sin([(f(X)]_{OFFSET}, X_{WIDTH}, R_T, L_V)) + L_V \quad \text{Eq. 28:}$$

Typically, the parameters set $X_{OFFSET}$, $X_{WIDTH}$, $R_T$, and $L_V$ are known values, wherein, the values of $X_{OFFSET}$, $X_{WIDTH}$, $R_T$, and $L_V$ can be known values because these values are determined using the first sensor 106 and/or the second sensor 109, they are measurable parameters of the vehicle 102, $V_H$, the like, or a combination thereof. According to one embodiment, the potential parking space is sufficiently long enough to accommodate the parallel parking maneuver if Equation 28 satisfies Equation 3.

Figure 7:
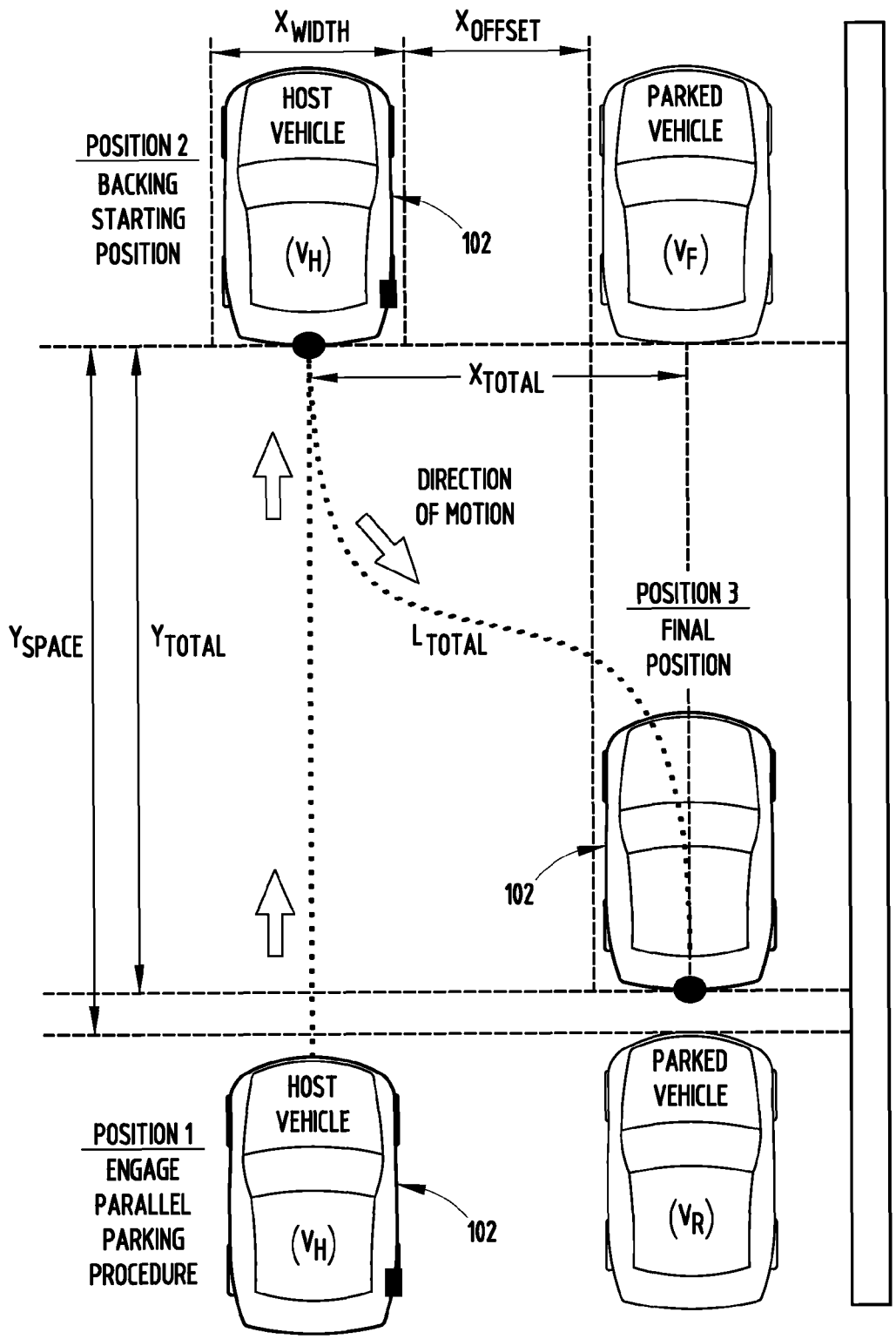
FIG. 7 is a schematic diagram illustrating an exemplary path of travel of a vehicle when parallel parking, in accordance with one embodiment of the present invention.

With respect to FIG. 7, known vehicle system parameters can include $X_{WIDTH}$, $R_T$, $L_V$, $Y_S$, $X_{MAX}$, and $X_{MIN}$, according to one embodiment. When a user of the vehicle 102, $V_H$ desires to parallel park, the user can stop the vehicle 102, $V_H$ at Position 1 and enable the parallel parking assistant system 100. The vehicle 102, $V_H$ can then move forward slowly (autonomous or semi-autonomously) past the rear adjacent object (e.g., the rear parked vehicle $V_R$), and potential parking space, until the sensor 106 detects the forward adjacent object (e.g., the forward parked vehicle $V_F$). The vehicle 102, $V_H$ motion will stop at Position 2 when the vehicle 102, $V_H$ rear bumper is aligned with the forward parked vehicle $V_F$ rear bumper. The length of the parking space $Y_{SPACE}$ can be measured from a vehicle 102, $V_H$ motion sensor (e.g., a wheel speed sensor). An offset distance $X_{OFFSET}$ can be measured from the sensor 106, and longitudinal distance $Y_{TOTAL}$ can be calculated from Equation 28.

The parallel parking assistant system 100 can inform a driver of the vehicle 102, $V_H$ whether the potential parking space is suitable for parallel parking operation when the conditions Equations 1 and 2 are met. If the parallel parking space is suitable, the user of the vehicle 102, $V_H$ can engage the parallel parking assisting system 100 to allow the vehicle 102, $V_H$ to move backwards slowly (autonomously or semi-autonomously) to perform the following three (3) backing maneuvers sequences.

The first backing steering maneuver can include the steering system 104 being substantially in clockwise locking position. The vehicle 102, $V_H$ moves backwards until the following transitional conditions are met:

$$L_{T1M} = L_{T1} \quad \text{Eq. 29:}$$

Using Equation 12 with Equations 15 and 16 yields:

$$L_{T1M} = R_T\theta_T \text{ (wherein } \theta_T \text{ is translated into radians)} \quad \text{Eq. 30:}$$

Using Equation 25, Equation 30 then becomes:

$$L_{T1M} = R_T f(X_{OFFSET}, X_{WIDTH}, R_T, L_V) \quad \text{Eq. 31:}$$

The substantially linear or straight backing maneuver can be when the steering system 104 is substantially straight (e.g., $\theta_{STEERING} = 0°$), wherein the vehicle 102, $V_H$ moves backward until the following transitional conditions are met:

$$L_{LM} = L_L \quad \text{Eq. 32:}$$

Using Equation 22 with Equation 32 yields:

$$L_{LM} = \frac{L_V}{\cos(\theta_T)} - R_T\tan(\theta_T) \quad \text{Eq. 33}$$

Using Equation 25, then Equation 33 becomes:

$$L_{LM} = \frac{L_V}{\cos(f(X_{OFFSET}, X_{WIDTH}, R_T, L_V))} - \quad \text{Eq. 34}$$
$$R_T\tan(f(X_{OFFSET}, X_{WIDTH}, R_T, L_V))$$

The second backing steering maneuver can be accomplished when the steering system 104 is substantially locked in a counter-clockwise position, and the vehicle 102, $V_H$ moves backwards until the following stopping condition is met:

$$L_{T2M} = L_{T2} \quad \text{Eq. 35:}$$

Using Equation 12 with Equations 15 and 16 yields:

$$L_{T2M} = R_T\theta_T \text{ (wherein } \theta_T \text{ is translated into radians)} \quad \text{Eq. 36:}$$

Using Equation 25, then Equation 26 becomes:

$$L_{T2M} = R_T f(X_{OFFSET}, X_{WIDTH}, R_T, L_V) \quad \text{Eq. 37:}$$

The vehicle 102, $V_H$ can then be positioned between the two parked vehicles $V_F$, $V_R$, or adjacent objects that define the parking space.

Figure 8:
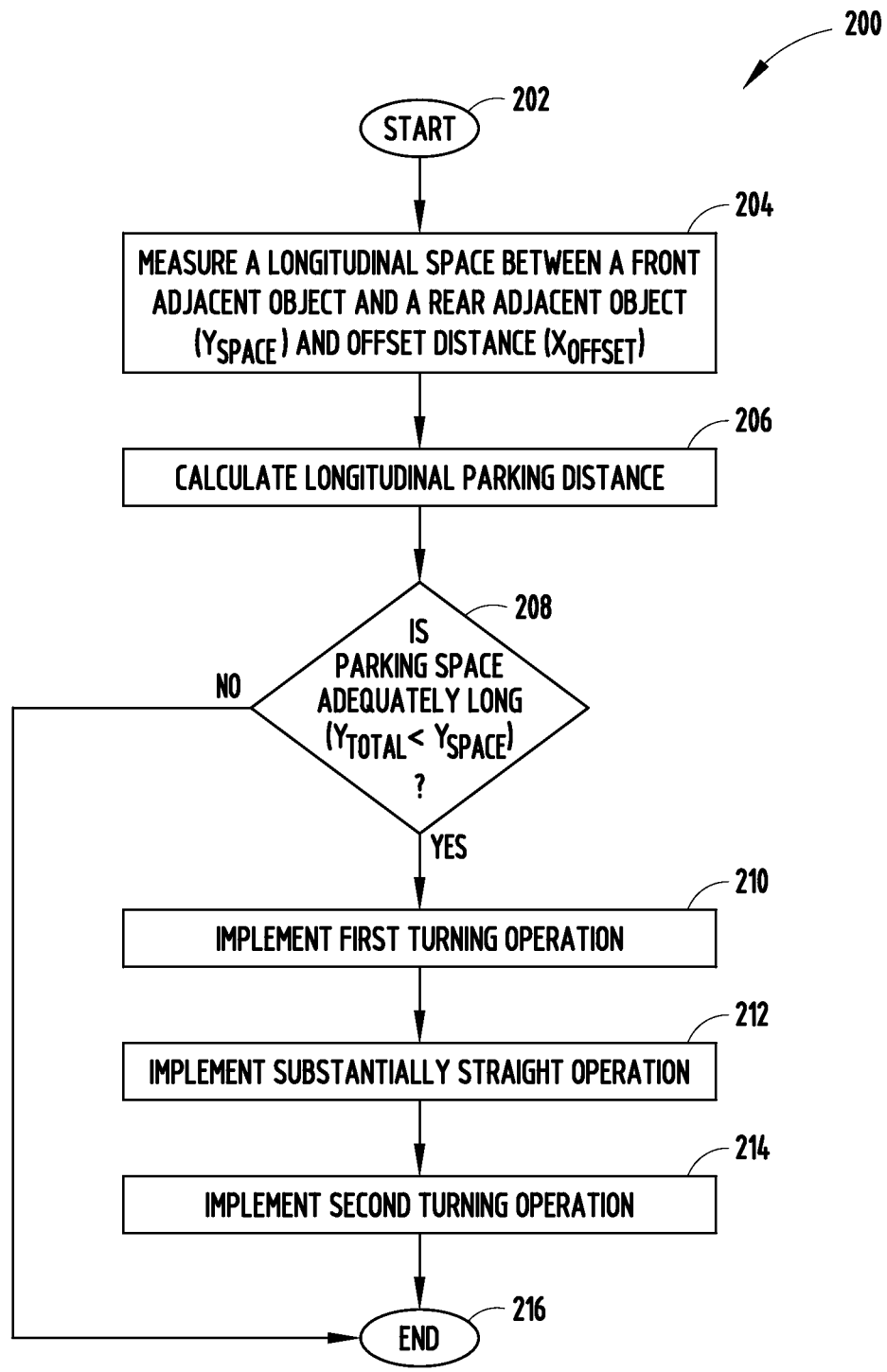
FIG. 8 is a flowchart illustrating a method of parallel parking a vehicle, in accordance with one embodiment of the present invention.

With respect to FIGS. 1-8, a method of parallel parking the vehicle 102, $V_H$ that includes the steering system 104 is generally shown in FIG. 8 at reference identifier 200. The method 200 starts at step 202, and can proceed to step 204, wherein a longitudinal space between a front adjacent object (e.g., a forward positioned object, such as, but not limited to, a front parked vehicle $V_F$) and a rear adjacent object (e.g., a rear positioned object, such as, but not limited to, a rear parked vehicle $V_R$) is measured, according to one embodiment. The method 200 then proceeds to step 206, wherein a longitudinal parking distance is calculated.

At decision step 208, it is determined if the parking space is adequately long enough (e.g., $Y_{TOTAL}$ is less than $Y_{SPACE}$). If it is determined at decision step 208 that the parking space is not adequately long enough, then the method 200 proceeds to step 216, wherein the method 200 ends. However, if it is determined at decision step 208 that the parking space is adequately long enough, the method 200 proceeds to step 210. At step 210, the first turning operation is implemented. Typically, the first turning operation includes turning the steering system 104 in a counter-clockwise direction, while the vehicle 102, $V_H$ travels a first reversing distance. At step 212 a substantially straight operation is implemented, and at step 214, a second turning operation is implemented. Typically, the second turning operation includes turning the steering system 104 in a clockwise direction, while the vehicle 102, $V_H$ travels a third reversing distance. The method 200 then ends at step 216.

Advantageously, the parallel parking assistant system 100 and method 200 can be utilized to park a vehicle 102, $V_H$ within a parking space defined by two objects, such as two parked vehicles $V_F, V_R$, wherein the parallel parking assistant system 100 can be an autonomous mode, a semi-autonomous mode, or a manual mode. The parallel parking assistant system 100 provides assistance to a driver of the vehicle 102, $V_H$ to parallel park the vehicle 102, $V_H$, while requiring minimal hardware by utilizing a single sensor 106, which can reduce a cost of manufacturing. It should be appreciated by those skilled in the art that the parallel parking assistant system 100 and method 200 can have additional or alternative advantages. It should further be appreciated by those skilled in the art that the above-described components of the parallel parking assistant system 100 and steps of the method 200 can be combined in additional or alternative ways.

Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

The invention claimed is:

1. A method of parallel parking a vehicle that comprises a steering system, said method comprising the steps of:
   determining a first distance between a side of the vehicle and an object adjacent said side of the vehicle;
   determining a second distance between a forward positioned object and a rear positioned object that define a parking space;
   rotating the steering system in a clockwise direction while the vehicle is moving in a reverse direction for a first reversing distance;
   rotating the steering system to a substantially straight position while the vehicle is moving in a reverse direction for a second reversing distance, wherein a distance traveled during first and second reversing distances is a function of a length of the vehicle; and
   rotating the steering system to a counter-clockwise direction while the vehicle is moving in a reverse direction for a third reversing distance, wherein a distance traveled during said first, second, and third distances is a function of said determined distance, a longitudinal displacement of the vehicle during said rotating said steering system steps, and a lateral displacement of the vehicle during said rotating said steering system steps.

2. The method of claim 1, wherein said steps of rotating the steering system are configured to be all, but only one at a time, autonomous, semi-autonomous, and manual.

3. The method of claim 2, when in said manual mode, further comprising the step of:
   providing commands to a user of the vehicle, who then controls the steering system based upon said provided commands.

4. The method of claim 1 further comprising the step of:
   rotating the steering system to be in a substantially straight position, while the vehicle is moving in a forward direction from said rear positioned object towards said forward positioned object.

5. The method of claim 1, wherein said longitudinal and lateral displacement of the vehicle during said first, second, and third commands is a function of a length of a parking space (YSPACE), an offset distance between the vehicle and a forward positioned object (XOFFSET), and a width of the vehicle (XWIDTH).

6. The method of claim 1 further comprising the step of:
   utilizing a substantially equal vehicle backing dynamic motion parameter characteristic when performing both said steps of rotating the steering system in a clockwise direction and rotating the steering system in a counter-clockwise position.

7. A method of parallel parking a host vehicle, said method comprising the steps of:
   determining a lateral and longitudinal distance of a parking space;
   determining an offset distance between the host vehicle and an adjacent forward positioned object;
   implementing a first substantially maximum turning operation while displacing the vehicle a first reversing distance;
   implementing a substantially straight operation while displacing the vehicle a second reversing distance; and
   implementing a second substantially maximum turning operation while displacing the vehicle a third reversing distance, wherein said first substantially maximum turning operation and said second substantially maximum turning operation are different directions, wherein said longitudinal and lateral displacement of the vehicle during said first, second, and third commands is a function of a length of a parking space (YSPACE), an offset distance between the vehicle and a forward positioned object (XOFFSET), and a width of the vehicle (XWIDTH).

8. The method of claim 7, wherein said first substantially maximum turning operation is a clockwise direction, and said second substantially maximum turning operation is a counter-clockwise direction.

9. The method of claim 8 further comprising the step of:
   utilizing a substantially equal vehicle backing dynamic motion parameter characteristic when performing both said steps of implementing said first substantially maximum turning operation in said clockwise direction and implementing said second substantially maximum turning operation in said counter-clockwise position.

10. The method of claim 7, wherein said step of determining a lateral distance of a parking space comprises determining a distance between a forward positioned adjacent object and a rear positioned adjacent object while the vehicle is moving forward, such that said forward positioned adjacent object and said rear positioned adjacent object define a parking space.

11. The method of claim 7 configured to be all, but only one at a time, autonomous, semi-autonomous, and manually.

12. The method of claim 11, when in said manual mode, further comprising the step of:
   providing commands to a user of the vehicle, such that the user can control a steering system of the vehicle based upon said provided commands.

* * * * *